No. 655,665. Patented Aug. 7, 1900.
A. G. WATERHOUSE & J. S. FORBES.
APPARATUS FOR HEATING AND STERILIZING FLUIDS.
(Application filed Feb. 24, 1900.)

(No Model.)

Witnesses:-
Charles De Cou.
Louis M. F. Whitehead.

Inventors:-
Addison G. Waterhouse.
John S. Forbes.
by their Attorneys:-
Howson & Howson

UNITED STATES PATENT OFFICE.

ADDISON G. WATERHOUSE AND JOHN S. FORBES, OF PHILADELPHIA, PENNSYLVANIA, ASSIGNORS TO SAID FORBES.

APPARATUS FOR HEATING AND STERILIZING FLUIDS.

SPECIFICATION forming part of Letters Patent No. 655,665, dated August 7, 1900.

Application filed February 24, 1900. Serial No. 6,379. (No model.)

*To all whom it may concern:*

Be it known that we, ADDISON G. WATERHOUSE and JOHN S. FORBES, citizens of the United States, and residents of Philadelphia, Pennsylvania, have invented certain Improvements in Apparatus for Heating and Sterilizing Fluids, of which the following is a specification.

The object of our invention is to provide an apparatus for heating fluids to a predetermined temperature and to arrange the apparatus so that all the fluid passing through the apparatus will be heated to the desired temperature, so that the apparatus can be used for the purifying of liquids to kill disease germs or for the heating of a liquid and at the same time preventing the liquid being overheated or not sufficiently heated. This object we attain in the following manner, reference being had to the accompanying drawings, in which—

Figure 1:
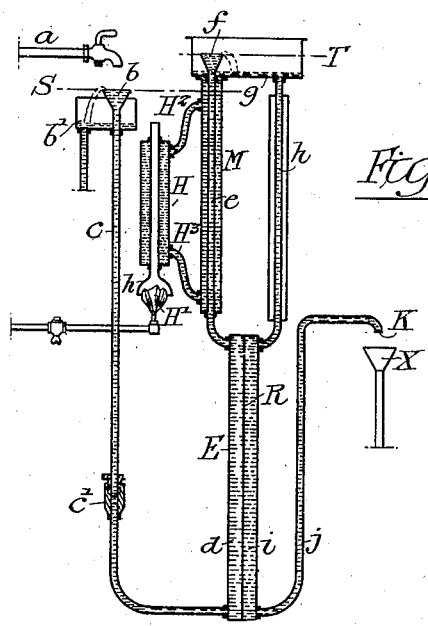
Figure 2:
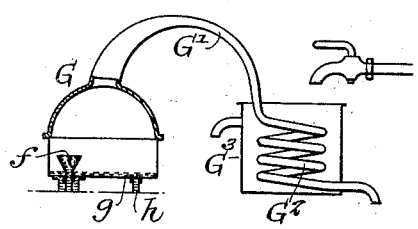

Figure 1 is a sectional elevation of one form of apparatus embodying our invention. Fig. 2 is a view of the upper portion of Fig. 1, showing a covering for the weir-tank connected to the condenser.

Referring in the first instance to Fig. 1, $a$ is the source from which the fluid to be treated is supplied.

$b$ is the receiver for the liquid, in the form of a funnel in the present instance. This receiver is connected to a pipe $c$, which is connected in turn to one-half of the heat-exchange E. The stand-pipe $c$ is preferably made in two parts, so as to allow for adjustment. One part carries a stuffing-box $c'$, into which extends the end of the other section of the pipe. The heat-exchange E is divided into two water-tight compartments $d$ and $i$ by a thin partition R. $e$ is a stand-pipe which is connected to the upper end of the heat-exchange and communicates with the compartment $d$, with which also communicates the pipe $c$. The stand-pipe $e$ extends into a tank $g$ and terminates in a funnel-shaped weir $f$ some distance above the bottom of the tank. The pipe $e$ extends through a water or steam jacket M, which incloses nearly the full length of the pipe in the present instance.

H is a heater connected to the jacket M at top and bottom by pipes $H^2$ and $H^3$. Passing through the heater is a chimney $h$, flared at its lower end, and directly under this chimney is a burner H'. The flame from this burner heats the chimney, which in turn will heat the water in the heater H, and the water will circulate through the heater and jacket and the upper and lower connecting-tubes. Any degree can be attained by regulating the amount of gas-flame. In the present instance gas is used; but it will be understood that any heating apparatus may be used as a substitute.

Extending from the bottom of the tank $g$ is a pipe $h$, which enters the top of the compartment $i$ of the heat-exchange. This pipe $h$ is preferably covered with a non-conducting material, so as to prevent the escape of heat before the liquid reaches the heat-exchange.

Communicating with the lower end of the compartment $i$ of the heat-exchange E is a pipe $j$, which extends up to or slightly above the top of the heat-exchange and has a discharge-opening K, so that the water escaping from the apparatus will flow into a receiving-funnel $x$.

In some instances we may cover the tank $g$, as shown in Fig. 2, with a closed hood G, to which is attached a vapor-pipe G', communicating with the condenser-coil $G^2$, placed in the cooling tank or vat $G^3$.

Surrounding the inlet-pipe $c$, directly under the funnel-shaped receiver $b$, is an overflow-tank $b'$, communicating with the overflow-pipe, so that in the event of the fluid overflowing the funnel or receiving-weir it will flow into the tank $b'$ and be carried off by the pipe. Thus it will be seen that the normal level of the fluid in the several pipes is the level of the fluid in the receiver $b$, as indicated by the dotted lines S, and in order that the fluid may escape from the stand-pipe $e$ it must overflow the weir $f$, which is at the dotted line T.

In operation the fluid to be treated enters from a source of supply through the valved pipe $a$ into the receiver $b$ and passes down the pipe $c$ and up through the compartment $d$ of the heat-exchange E, then up the stand-pipe $e$ until it reaches the water-line S, where it stops. If more fluid enters the receiver, it simply overflows into the tank $b'$, so normally the fluid cannot pass through the apparatus beyond the pipe $e$. If heat is applied, however, to the heater H by a gas-jet H' or other heating apparatus, the water in the jacket M will be heated and the fluid in the stand-pipe $e$ will expand, so that its specific gravity will be less than heretofore, and consequently it will take a higher column of hot fluid to balance the column of cold fluid in the pipe $c$, so that if enough heat is supplied or any fixed or limited degree of heat it will raise the height of the fluid in the pipe $e$ a proportionate amount above its normal level. If the height of the pipe $c$ and its receiver is adjusted so that the hot fluid in the pipe $e$ will just run over its weir $f$, then the fluid that enters in its place, if it is not heated to the same degree, will not expand enough to run over, and if too much heat is applied it will run over faster and not remain in the pipe $e$ long enough to become overheated, so that by adjusting the height of the receiver $b$ the temperature of the overflowing liquid can be regulated to correspond to any degree of heat. When the fluid passes over the weir $f$, it falls in the tank $g$ and then passes down the protected pipe $h$ into the top of the compartment $i$ of the heat-exchange E, and this heat is conducted through the partition R, raising the temperature of the incoming cold fluid, so that the cold fluid is heated to a certain degree by the time it reaches the top of the heat-exchange E, while the hot fluid is cooled by the time it reaches the bottom of the heat-exchange, at which point it is drawn off through the pipe $j$. The result is that no fluid can pass through the apparatus at its normal temperature, but must depend upon the temperature being raised to a predetermined degree, and the fluid entering cool is raised to a certain temperature, and the fluid leaving the apparatus is cooled to about the same temperature as the fluid entering the apparatus.

If it is desired to heat and cool the fluid several times—as in sterilizing milk, for instance—a series of apparatus such as above described may be coupled together for this purpose.

It is often profitable to collect the volatile matter from fluids treated, and this is generally accomplished by providing the tank $g$ with the hood G, as shown in Fig. 2, and connecting this hood with a condensing-worm $G^2$. If combustible gases are produced, the same can be conducted to a receptacle or used direct for maintaining the heat at the heater or otherwise.

In some instances the heat-exchange may be dispensed with and the pipe $c$ coupled directly to the stand-pipe $e$.

We claim as our invention—

1. The combination in an apparatus for heating fluids, of a receiver, a heat-exchange, a pipe forming communication between the receiver and the lower portion of one compartment to the heat-exchange, a stand-pipe communicating with the upper end of said compartment, means for applying heat to the fluid in said stand-pipe, said stand-pipe extending above the level of the receiver, a tank, an outlet-pipe communicating with the upper end of the other compartment of the heat-exchange, and an outlet-pipe communicating with the lower end of said compartment, the whole being constructed so that the temperature of the fluid must be raised to a predetermined degree of heat before it will flow through the apparatus, substantially as specified.

2. The combination of a receiver, a two-part heat-exchange, a pipe communicating with the lower portion of said exchange, the receiver being so arranged that its height can be increased or decreased, a stand-pipe communicating with the upper end of the heat-exchange, means for heating the fluid in said stand-pipe, said stand-pipe extending above the level of fluid in the receiver, a discharge-pipe communicating with the upper end of the other compartment of the heat-exchange, and a pipe communicating with the lower end of said compartment, substantially as specified.

3. The combination of the receiver, a two-part heat-exchange, a pipe forming communication between the receiver and the lower portion of the heat-exchange, a stand-pipe communicating with the upper portion of said compartment and extending above the level of the fluid in the receiver, a heater, circulating-pipes communicating the heater with the jacket, a chimney passing up through the heater, and means for heating the fluid in the heater, a tank into which the stand-pipe extends, a pipe extending from said tank to the upper end of the other compartment of the heat-exchange, and an outlet-pipe for said compartment, substantially as specified.

4. The combination of a receiver, a two-part heat-exchange, a pipe connecting the receiver with one compartment of the heat-exchange, a stand-pipe communicating with the upper end of said compartment, means for heating the fluid in said stand-pipe, a tank into which the stand-pipe extends, the top of the stand-pipe being above the level of the fluid in the receiver, an outlet-pipe communicating with the tank and with the other portion of the heat-exchange, an outlet for the other portion of the heat-exchange, a hood covering the said tank, and a condenser connected to the said hood, substantially as specified.

In testimony whereof we have signed our names to this specification in the presence of two subscribing witnesses.

ADDISON G. WATERHOUSE.
JOHN S. FORBES.

Witnesses:
ROBERT W. LLOYD,
CHARLES SANDERSON.